TELEPHONE TEST SET
Filed Feb. 20, 1961
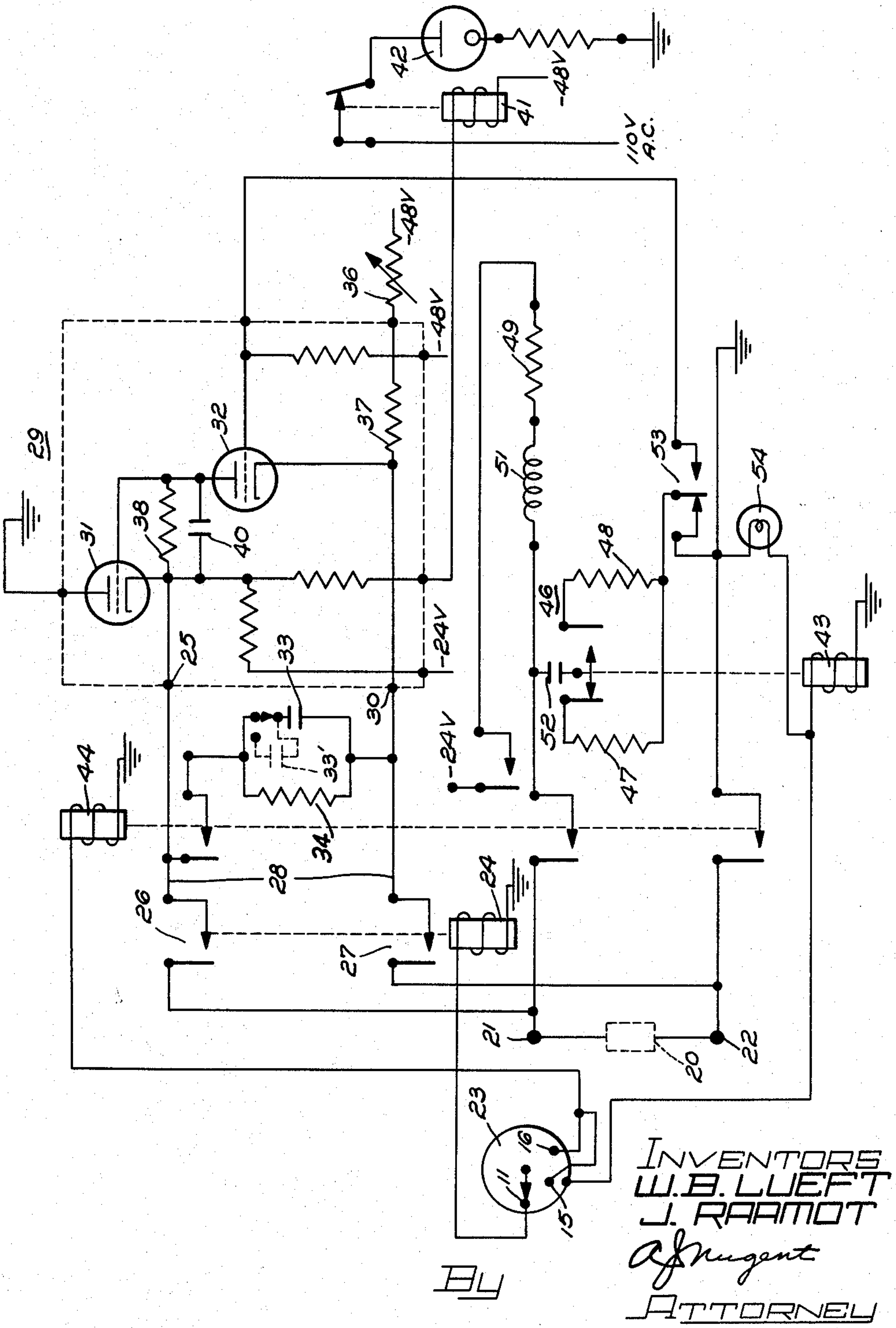
INVENTORS
W. B. LUEFT
J. RAAMOT
BY A J Nugent
ATTORNEY 3,185,781
TELEPHONE TEST SET Walter B. Lueft, North Merrick, N.Y., and Jaan Raamot, Cresskill, N.J., assignors to Western Electric Company, Incorporated, a corporation of New York Filed Feb. 20, 1961, Ser. No. 90,464
8 Claims. (Cl. 179—175)

This invention relates to testing telephone sets and particularly to testing the insulation resistance of the ringing capacitor, and to testing the talking and receiving circuits.

In the testing of telephone sets, it is desirable to perform, in sequence, rapid and reliable automatic tests of various telephone set characteristics. These desirable ends are obviously advanced when the tester's job is quickened and simplified. As an example of the problem, in prior telephone testing procedures it has been the practice to perform tests by means of meters which are relatively difficult to observe. Also, prior testing equipment involved a relatively large number of complex manipulative procedures on the part of the tester.

One of the objects of the invention is a test set capable of making rapid and reliable tests of certain characteristics of electrical devices.

One feature of the invention relates to the testing of the insulation resistance of the ringing capacitor of a telephone set.

An additional feature of the invention resides in the testing of the talking and receiving circuits of a telephone set.

The above object and features are not to be considered all inclusive, as other objects and features will become apparent as the description proceeds.

The present invention is incorporated in an automated telephone test set wherein an operator by manipulating conveniently located switches can run telephone sets progressively and rapidly through a series of tests. A selector switch is stepped through a series of positions to make the required tests while the results are observed at the various positions on a test panel which includes indicators appropriately illuminated in accordance with test results.

In carrying out the invention, a telephone set to be tested is connected in the input of a bistable circuit which is made to oscillate, or prevented from oscillating, in accordance with the results of a particular test. An indicating circuit responds to the condition of the bistable circuit to indicate readily to a tester such results.

In one of the testing positions, a telephone test set tests the insulation resistance of the ringing capacitor of a telephone set by connecting the capacitor in a bistable circuit normally in a non-oscillating condition. On the establishment of such a connection, if the capacitor under test meets the resistance requirements, the circuit is placed in its oscillating condition and an indicator such as a test lamp flashes this information to the tester. A steady lamp indicates an open condition of the resistor. If the resistance is below the required value, the lamp is extinguished.

In another testing position, the talking and receiving paths are checked. For such a test, a circuit is established to the bistable circuit which responds, or fails to respond, to voice signals and accordingly indicates the condition of the talking path.

The invention also provides an efficiency circuit operable to test one coded telephone by having the tester listen to his own voice, and to test another coded telephone set by a "howl—no howl" arrangement.

The invention will now be described in detail by reference to the schematic circuit shown in the drawing.

Referring now to the drawing, the leads of a telephone set 20 to be tested are placed in circuit between the terminals 21 and 22. In order to make a ringing capacitor insulation resistance test, it will be assumed that the selector switch 23 is stepped to a position designated arbitrarily as position 11, previous tests of other characteristics having been made in preceding positions. In that position, relay 24 operates from a voltage supply (not shown), closing contacts 26 and 27 in a path 28 extending to the input terminals 25 and 30 of a bistable circuit 29 which includes the tubes 31 and 32. Capacitor 33 and resistor 34 are connectible across path 28 and simulate the ringing capacitor of a telephone set to be tested. By reason of this arrangement, the test circuit may be calibrated by adjusting the variable resistor 36 in the supply voltage lead coupled to the cathode of the tube 32.

With the circuit initially at rest, when relay 24 operates, the ringing capacitor under test behaves initially as a short circuit and starts to charge up through the upper tube 31, resistor 37, and potentiometer 36. The voltage so developed appears as a cathode bias on the lower tube 32 and prevents this tube from conducting. Since the lower tube 32 is cut off, no current will flow through resistor 38 and, hence, there will be no voltage drop across that resistor. As the ringing capacitor charges up, the cathode bias of the lower tube 32 decreases until it becomes sufficiently small to allow the lower tube to start conducting. In this connection, it should be noted that the plate side of the upper tube 31 is at ground potential. As soon as conduction starts in the lower tube 32, a voltage drop develops across resistor 38 due to both the upper tube current and the ringing capacitor discharging through resistor 38 and the lower tube 32. At this time, the voltage drop across resistor 38 appears as a negative grid bias on the upper tube 31 and cuts that tube off. As the ringing capacitor under test continues to discharge through the lower tube 32, the voltage drop across resistor 38 decreases until it becomes sufficiently small to allow the upper tube 31 to start conducting again. However, this causes the lower tube to be cut off and the cycle repeats. As previously mentioned, the circuit is calibrated by means of the potentiometer 36 so that with capacitor 33 and resistor 34 in the circuit, the cathode bias on the lower tube 32 is just large enough to prevent that tube from conducting. If the ringing capacitor under test has less than one megohm of insulation resistance, the cathode bias on the lower tube 32 will be still greater, whereas if the insulation resistance is one megohm or greater, the cathode bias will decrease and will allow the lower tube to conduct and start the cycle described above.

The cathode circuit of the upper tube 31 includes a relay 41 for operating a test lamp 42. If the capacitor under test is open, the test lamp 42 will be on. If the capacitor under test is shorted or has less than one megohm insulation resistance, relay 41 will operate and the test lamp will be off. If the capacitor under test is good, one megohm or greater, relay 41 will alternately operate and release, causing the test lamp 42 to flash at a rate determined by the size of the capacitor under test. Since the value of the capacitor determines the flashing rate, capacitors of distinct separate values may be tested and the operator, by observing the flashing rate, can determine whether a capacitor of the proper value is being tested. In some cases, one capacitor is tested and then, in a second step, a second capacitor 33′, indicated in dotted lines, in series with the first capacitor is tested. In this explanation, for the sake of convenience, it is assumed that capacitor 33 represents a first capacitor to be tested instead of a capacitor used for calibration purposes as previously explained. Variation of the flashing rate during the second step is thus an indication that the second capacitor is not shorted. Capacitor 40 is added to eliminate the tendency of the circuit to oscillate at a high frequency rate because of inter-wiring capacitance.

In order to make a test of the talking and receiving circuits, the selector switch 23 is stepped to positions 15 and 16. In position 15, relays 43 and 44 are operated by means of a voltage source (not shown), but in position 16, only relay 44 is operated. The talking and receiving tests use an efficiency circuit designated generally as 46 in the drawing. The circuit includes a —24 v. source, resistors 47, 48 and 49, choke coil 51, and capacitor 52. In testing one coded telephone set connected via input terminals 21 and 22, the tester merely talks into the transmitter and if he hears himself on the receiver, the test is good. In testing another coded telephone set, the hand set is placed in a wooden trough (not shown), and a howl-no howl test is made. In this test, when the selector is stepped into position 15, relay 44 operates, connecting —24 v. through current limiting resistor 49, choke coil 51, to terminal 21, through the telephone to the terminal 22 grounded at this time.

The initial surge of current through the efficiency circuit and the induction coil of the telephone actuates the telephone receiver, causing sound waves in the trough which are picked up by the transmitter. This signal through the transmitter actuates the receiver still more and the signal builds up to a point where there is an audible howl. A resulting current through the telephone and the test circuit consists of D.C. with an audio signal imposed on it. A choke coil 51 keeps the audio signal out of the D.C. supply while the capacitor 52 provides a bypass for the audio signal through resistor 48. Resistor 48 causes a loss in the circuit, but it is not sufficient to prevent howling of a good telephone set. When the selector is stepped to position 16, relay 43 releases and the reoperation of relay 44 substitutes resistor 47 for resistor 48 in the bypass circuit, increasing the loss. The additional loss should cause the howl to cease because of a reduction in the current to a value which is insufficient to sustain oscillation.

If the telephone fails to reproduce the voice or to howl, depending upon the type of set being tested, the tester must locate the trouble which is either in the telephone talking path or the receiving path. To aid the tester in determining the trouble condition, a talking circuit check is provided. With the selector switch in position 15, the operation of the talk check switch 53 connects the efficiency circuit to the grid of the lower tube 32 of the bistable circuit. At the same time, in position 15 the calibration network 33–34 previously described is connected to the inputs 25 and 30 due to the operation of relay 44. It will be recalled that, in connection with the capacitor resistance test, the bistable circuit 29 is adjusted at the point at which the circuit is not oscillating and the lamp 42 does not flash.

In making the talking circuit check, the tester talks into the telephone transmitter. If the telephone talking path is good, the A.C. voice signal will be coupled through capacitor 52, resistor 48, and the talk check switch 53, to the grid of the lower tube 32. This A.C. signal will then upset the equilibrium of the capacitor circuit due to the additional grid bias, and the test lamp should begin to flash. If the lamp flashes, the talking path is good and, therefore, the trouble must be in the receiving path. If the lamp is continuously out, this is an indication of trouble in the telephone talking path. The talk check lamp 54 lights up in position 15 only in a circuit parallel to relay 43.

Obviously, in the "on-hook" condition of the telephone, the input terminals 21 and 22 of the test set see the ringing capacitor; and in the "off-hook" condition, the terminals see the talking and receiving circuits.

Various changes may be made without departing from the spirit of the present invention.

What is claimed is:

1. A testing circuit including a bistable circuit capable of oscillatory operation, the circuit having a pair of electron devices, means for biasing the respective inputs of the devices so that one device is adapted to remain in the conducting condition and the other device is adapted to remain in the non-conducting condition, means for coupling an electrical device to be tested to the input of one of the devices, the bias of the input so coupled being controlled in dependence on the change in bias provided by the electrical device, whereby the bistable circuit is enabled to oscillate or to assume one of its two stable states, and indicating means coupled to the output of the bistable circuit to indicate the response of the bistable circuit to the electrical device being tested.

2. A testing circuit according to claim 1 wherein the indicating means comprises a lamp having three operating states, namely, an "on" state and an "off" state respectively responsive to the two stable states of said bistable circuit, and an alternately "on" and off" state responsive to the oscillatory operation of said bistable circuit.

3. A telephone set testing circuit including a bistable circuit capable of oscillatory operation, the circuit having a pair of electron devices, means biasing the respective inputs of the devices so that one device is adapted to remain in the conducting condition and the other device is adapted to remain in the non-conducting condition, means for coupling a telephone set in the on-hook condition to the input of one of the devices to test the insulation resistance of the ringing capacitor, the bias of the input so coupled being controlled in dependence on the change in bias provided by the ringing capacitor, whereby the bistable circuit is enabled to oscillate or to assume one of its two stable states, and indicating means coupled to the output of the bistable circuit to indicate the response of the bistable circuit to the ringing capacitor being tested.

4. A telephone set testing circuit including a bistable circuit capable of oscillatory operation, the circuit having a pair of electron devices, means biasing the respective inputs of the devices so that one device is adapted to remain in the conducting condition and the other device is adapted to remain in the non-conducting condition, means for coupling a telephone set in the off-hook condition to the input of one of the devices to test the talking circuit, the bias of the input so coupled being controlled in dependence on the change in bias provided by the talking circuit whereby the bistable circuit is enabled to oscillate or to assume one of its two stable states, and indicating means coupled to the output of the bistable circuit to indicate the response of the bistable circuit to the talking circuit being tested.

5. A testing circuit according to claim 4, including a resistor capacitor network for transmitting voice signals between the telephone set and the input of the device so coupled.

6. A testing circuit including a bistable circuit capable of oscillatory operation, the circuit having a pair of vacuum tubes, means for biasing the respective inputs of the tubes so that one tube is adapted to remain in the conducting condition and the other tube is adapted to remain in the non-conducting condition, means for coupling a capacitor, the insulation resistance of which is to be tested, to the input of one of the tubes, said last-mentioned means including a first resistor coupled to the cathode of said one tube and to the means for biasing the input thereof, there being a second resistor connected between the cathode of the other tube and the plate of said one coupled tube, the capacitor under test being adapted to be connected between the cathodes of the two tubes, the bias of the input to said one tube being controlled by and dependent on the change in bias provided by the capacitor, whereby the bistable circuit is enabled to oscillate or to assume one of its two stable states, and indicating means coupled to the output of the bistable circuit to indicate the response of the bistable circuit to the capacitor being tested.

7. A testing circuit including a bistable circuit capable of oscillatory operation, the circuit having a pair of vacuum tubes, means for biasing the respective inputs of the tubes so that one tube is adapted to remain in the conducting condition and the other tube is adapted to remain in the non-conducting condition, means for coupling a capacitor, the insulation resistance of which is to be tested, to the input of one of the tubes, said last-mentioned means including a first resistor and a variable resistor serially coupled to the cathode of said one tube and to the means for biasing the input thereof, there being a second resistor connected between the cathode of the other tube and the plate of said one coupled tube, the capacitor under test being adapted to be connected between the cathodes of the two tubes, the bias of the input to said one tube being controlled by and dependent on the change in bias provided by the capacitor, whereby the bistable circuit is enabled to oscillate or to assume one of its two stable states, and indicating means coupled to the output of the bistable circuit to indicate the response of the bistable circuit to the capacitor being tested.

8. A testing circuit including a bistable circuit capable of oscillatory operation, the circuit having a pair of vacuum tubes, means for biasing the respective inputs of the tubes so that one tube is adapted to remain in the conducting condition and the other tube is adapted to remain in the non-conducting condition, means for coupling a capacitor, the insulation resistance of which is to be tested, to the input of one of the tubes, said last-mentioned means including a first resistor coupled to the cathode of said one tube and to the means for biasing the input thereof, there being a second resistor and a capacitor connected in parallel between the cathode of the other tube and the plate of said one coupled tube, the bias of the input to said one tube being controlled by and dependent on the change in bias provided by the capacitor, whereby the bistable circuit is enabled to oscillate or to assume one of its two stable states, and indicating means coupled to the output of the bistable circuit to indicate the response of the bistable circuit to the capacitor being tested.

References Cited by the Examiner

UNITED STATES PATENTS

| | | | |
|---|---|---|---|
| 2,086,965 | 7/37 | Shepard | 324—57 |
| 2,601,492 | 6/52 | Baker | 324—57 |
| 2,979,574 | 4/61 | Lowry | 179—175.2 |
| 3,026,473 | 3/62 | De Mott | 324—57 |
| 3,042,859 | 7/62 | Shillington | 324—54 |
| 3,042,860 | 7/62 | Shillington | 324—54 |
| 3,048,819 | 8/62 | Helder et al. | 179—175 |

ROBERT H. ROSE, *Primary Examiner.*

L. MILLER ANDRUS, *Examiner.*